United States Patent
Du et al.

(10) Patent No.: US 9,945,937 B2
(45) Date of Patent: Apr. 17, 2018

(54) CALIBRATION METHOD BASED ON DUAL-TRANSMITTING DUAL-RECEIVING PHASE MEASUREMENT AND DISTANCE-MEASURING DEVICE THEREOF

(71) Applicant: JIANGSU LAITZ OPTOELECTRONICS TECHNOLOGY CO., LTD., Changzhou, Jiangsu Province (CN)

(72) Inventors: Xin Du, Changzhou (CN); Baiwen Qiao, Changzhou (CN); Xiaoyi Zha, Changzhou (CN); Xi Liu, Changzhou (CN)

(73) Assignee: JIANGSU LAITZ OPTOELECTRONICS TECHNOLOGY CO., LTD., Changzhou (CN)

( * ) Notice: Subject to any disclaimer, the term of this patent is extended or adjusted under 35 U.S.C. 154(b) by 395 days.

(21) Appl. No.: 14/889,674

(22) PCT Filed: Mar. 6, 2014

(86) PCT No.: PCT/CN2014/072969
§ 371 (c)(1),
(2) Date: Nov. 6, 2015

(87) PCT Pub. No.: WO2014/135097
PCT Pub. Date: Sep. 12, 2014

(65) Prior Publication Data
US 2016/0124078 A1    May 5, 2016

(30) Foreign Application Priority Data
Mar. 8, 2013 (CN) .......................... 2013 1 0073631

(51) Int. Cl.
*G01S 7/497* (2006.01)
*G01S 17/36* (2006.01)
*G01S 7/481* (2006.01)

(52) U.S. Cl.
CPC .............. *G01S 7/497* (2013.01); *G01S 7/481* (2013.01); *G01S 17/36* (2013.01)

(58) Field of Classification Search
CPC ........... G01S 7/497; G01S 7/481; G01S 17/36
See application file for complete search history.

(56) References Cited

U.S. PATENT DOCUMENTS

| 4,600,299 A | 7/1986 | Abshire |
| 2015/0088448 A1* | 3/2015 | Du ........................ G01S 17/36 702/97 |

FOREIGN PATENT DOCUMENTS

| CN | 1940595 A | 4/2007 |
| CN | 101482619 A | 7/2009 |

(Continued)

*Primary Examiner* — Eric L Bolda
(74) *Attorney, Agent, or Firm* — Maschoff Brennan

(57) ABSTRACT

A calibration method includes forming an external optical path, forming an internal optical path, and conducting a phase comparison between the second part of signals of the internal and external optical paths sequentially received by a second receiving device and the first part of signals of the internal and external optical paths sequentially received by a first receiving device. Two-way phase signals are outputted with part of a base reference being eliminated. Phase comparison is conducted again between the two-way signals with part of the base reference being eliminated, and the final phase signal is outputted with the base reference being eliminated. The distance-measuring device includes a transmitting device, first reflective surface, first and second receiving devices, first and second filters, and a phase detector. This realizes phase compensation and calibration, avoids introducing uncertain phase noise into a circuit due to (Continued)

environmental changes, improves distance-measurement precision, and reduces system costs.

10 Claims, 6 Drawing Sheets

(56) References Cited

FOREIGN PATENT DOCUMENTS

| | | | |
|---|---|---|---|
| CN | 101581783 | A | 11/2009 |
| CN | 102176021 | A | 9/2011 |
| CN | 102540170 | A | 7/2012 |
| CN | 202649463 | U | 1/2013 |
| CN | 202770994 | U | 3/2013 |
| JP | 06186337 | A | 7/1994 |
| JP | 20100203877 | A | 9/2010 |

* cited by examiner

A transmitting device transmits first-wavelength optical wave, partial optical wave are reflected by a first reflective surface and received by a first receiving device, the remaining portion of optical wave pass through a first filter to a detected object, are reflected back by the detected object and then received by a second receiving device, wherein the first-wavelength optical wave, as outer optical path signals, are generated by modulating high-frequency oscillation signals, the optical wave received by the first receiving device are a first portion of signals of the outer optical path, and the optical wave reflected back by the detected object and then received by the second receiving device are a second portion of signals of the outer optical path

S201

The transmitting device transmits second-wavelength optical wave, partial optical wave are reflected by the first reflective surface and received by the first receiving device, the remaining portion of optical wave pass through the second filter to the second receiving device, wherein the second-wavelength optical wave, as inner optical path signals of a base reference, are generated by modulating high-frequency oscillation signals, the optical wave received by the first receiving device are a first portion of signals of the inner optical path, and the optical wave passing through the second filter to the second receiving device are a second portion of signals of the inner optical path

S202

With step 1 and step 2 are performed, the transmitting device is sequentially switched to transmit the first optical wave and second optical wave, phase comparison is performed between the second portion of signals of the inner and outer optical paths sequentially received by the second receiving device and the first portion of optical wave of the inner and outer optical paths sequentially received by the first receiving device , phase signals of the inner and outer optical paths with partial base reference being eliminated are outputted, then phase comparison is performed for phase signals of the inner and outer optical paths with partial base reference being eliminated, and phase signals with the base reference being finally eliminated are outputted

CALIBRATION METHOD BASED ON DUAL-TRANSMITTING DUAL-RECEIVING PHASE MEASUREMENT AND DISTANCE-MEASURING DEVICE THEREOF

TECHNICAL FIELD

The present invention relates to the field of photoelectric distance measurement, and particularly to a calibration method and a distance-measuring apparatus based on dual-transmitting and dual-receiving phase measurement system.

BACKGROUND OF THE INVENTION

Laser has been an invention that human beings fell proud and it has characteristics such as accuracy, quickness and convenience, easy use and strong anti-interference performance. Laser technologies as developed from laser have solved many technical problems that traditional technologies cannot solve.

A laser range finder produced by integrating laser technologies with electronic technologies increasingly draws attention of industries such as civil use, military use and industrial concerning aspects such as length, height, distance, speed and shape measurement and has already been applied extensively to the following fields abroad: large industrial and mining enterprises, electrical power and petrochemical industry, water conservancy, communications, environment, architecture, geology, police affairs, fire fighting, explosion, navigation, railway, anti-terrorism/military affairs, scientific research institutions, agriculture, forestry, real estate, recreation/outdoor sports and so on.

A laser distance-measuring device based on the principle of phase difference detection uses a modulated laser beam to irradiate a detected object, and the laser beam is bent back by the detected object, and the phase difference occurring in the round trip of the laser beam be converted into a distance from the detected object, which is applied to short-distance measurement with high precision, and the accuracy and the precision of measurement by means of the said laser distance-measuring device be affected by properties of the inner parts of the said device. The higher the precision of the laser distance-measuring instrument is, the more complicated its circuit is and the more precise apparatuses are needed. Therefore, it cannot be neglected that a phase shift be generated by the instrument, due to the impact on the performance of the apparatus exerted by environmental factors, such as temperature and apparatus lifetime. The prior art mostly uses the theory of phase difference compensation between the inner and the outer optical path to eliminate additional phase shift from a circuit system, to ensure that data measurement is not affected by ambient environmental factors. The phase difference compensation theory to eliminate additional phase shift described in the present invention is summarized as follows:

Assuming that the phase differences in retard resulting from a distance-measuring signal travelling through an inner optical path and an outer optical path sequentially be $\Psi_{in}$ and $\Psi_{out}$, the phase detection results in a phase detector for dual-wavelength optical wave transmitted by a laser transmitting device passing through a first receiving device be $\Psi_{in1}$ and $\Psi_{out1}$, the phases of the said dual-wavelength optical wave received by a second receiving device be $\Psi_{in2}$ and $\Psi_{out2}$ respectively, an additional phase shift generated by an electronic signal generated by a signal generating device in the instrument in a first portion of signals during circuit transfer and photoelectric conversion be $\Delta\Psi_1$, an additional phase shift generated by an electronic signal generated by a signal generating device in the instrument in a second portion of signals during circuit transfer and photoelectric conversion be $\Delta\Psi_2$, and a signal phase generated by the transmitting device be $\Psi_{transmit}$, transmit the phase comparison result of the inner and outer optical path distance-measuring signal $e_{in}$ and $e_{out}$ in the phase detector is as follows:

$$\Psi_{in2}=\Delta\Psi_2+\Psi_{in}+\Psi_{transmit}$$

$$\Psi_{out2}=\Delta\Psi_2+\Psi_{out}+\Psi_{transmit}$$

$$\Psi_{in1}=\Delta\Psi_1+\Psi_{transmit}$$

$$\Psi_{out1}=\Delta\Psi_1+\Psi_{transmit}$$

In the above formulas, the change of operating status of $\Psi_{in1}$, $\Psi_{out1}$ $\Delta\Psi_2$ and $\Delta\Psi_2$ accompanied with the instrument under different environment be the random phase shift, and cannot be solved by precise calculation. Therefore, in a short period of time in the distance measurement by using an inner and outer optical path alternately, it can be deemed that there is no additional phase shift occurred during the inner and outer optical path alternate with each other. The difference value of the phase comparison results between the inner and outer optical path be taken as a measurement result accordingly, i.e.

$$\phi = \phi_{out} - \phi_{in} = (\psi_{out2} - \psi_{out1}) - (\psi_{in2} - \psi_{in1}) = \\ (\Delta\psi_2 - \Delta\psi_1 + \psi_{out}) - (\Delta\psi_2 - \Delta\psi_1 + \psi_{in}) = \psi_{out} - \psi_{in}$$

The above result Φ has already eliminated the impact exerted by instable additional phase shift, and it ensures the precision of distance measurement. There be the below calibration methods in the prior art:

(1) A single-transmitting and single-receiving system, namely, an optical signal transmitted via a single optical path and an optical signal received via a single optical path, and the inner and outer optical path be switched over by a controllable mechanical device, and phase calibration is performed by calculating phase values of the inner and outer optical path when switching over to eliminate an uncertain phase interference caused by the environment. Because of a mechanical switch, mechanical response time is long (generally an order of magnitude of several hundred milliseconds) so that real-time calibration cannot be performed, and furthermore the mechanical structure is relatively complicated which might easily come to mechanical wear and malfunction, and lead to a shortened lifetime. As a result, it is not suitable for working as an industrial precision instrument.

(2) A single-transmitting and dual-receiving system, namely, a light beam is transmitted via a signal optical path, and the inner optical path signal and the outer optical path signal are received respectively via the dual paths. The two signals received via the dual paths are processed respectively and are calculated for phase difference to eliminate an uncertain phase interference caused by the environment accordingly. The system uses two avalanche photo diodes (avalanche photo diode, APD) to receive the inner and the outer optical path signal respectively. Such dual-path amplifying circuit is apt to generate same-frequency interference. Furthermore, since avalanche voltage of each APD is different, the resultant phase shift is different. The avalanche voltage difference of APD needs to be limited less than 1V to ensure that the phase shift of different APDs are close. Therefore the requirement for APD is relative rigid and its production procedure is also increased.

(3) A conventional dual-transmitting and single-receiving system, namely, two light beams with the same wavelength are transmitted independently via dual optical paths, and the inner optical path signal and the outer optical path signal are sequentially received respectively by a receiving device. The two signals received via dual paths are processed respectively and are calculated for phase difference to eliminate an uncertain phase interference caused by the environment accordingly. The system generates two paths of optical wave signal with the same wavelength respectively by using two independent photoelectricity generating devices. Because two photoelectricity generating devices, especially two laser tubes, have the different working time of the inner and the outer optical path in operation, and because the above said principle cannot be used for eliminating different temperature drift extremely probably caused by the difference performance of the two lasers, a drift of the measured distance exist.

It is concluded that all of the above mentioned three solutions have drawbacks in practical application.

DESCRIPTION OF THE INVENTION

The purpose of embodiments of the present invention is to provide a phase measurement calibration method using dual-transmitting and dual-receiving devices, intended to solve the problem about phase drift caused by failure to completely calibrate temperature by dual-path independent same-wavelength laser tubes in the prior art.

The present invention is directed to a calibration method based on dual-transmitting and dual-receiving phase measurement system, comprising the following steps:

Step 1 for forming an outer optical path: a transmitting device transmits a first optical wave, the partial wave of the first optical wave is received by a first receiving device via a first reflective surface, and the remaining optical wave passes through a first filter to a detected object, and is bent back and then passes through a receiving lens and is focused by a second reflective surface, and then is received by a second receiving device; wherein the said first optical wave passes through the said first reflective surface and the said first filter to make two paths of optical wave as outer optical path signal of the phase measurement system, the said first optical wave passing through the said first reflective surface serve as a first portion of signal of the outer optical path, and the optical wave penetrating the first filter serve as a second portion of signal of the outer optical path;

when the said optical wave passing through the said first filter, a partial optical wave is reflected by the first filter or by other reflective sheets towards a second receiving device and is filtered by a second filter simultaneously;

step 2 for forming an inner optical path: the said transmitting device transmits a second optical wave, the partial wave of the second optical wave is received by a first receiving device via a first reflective surface, and the remaining optical wave is filtered by the first filter and reflected by the said first filter or other reflective sheets, and then passes through the second filter to reach the second reflective surface, and then is received directly by the second receiving device; wherein the said second optical wave passes through the said first reflective surface and the said second filter to make two paths of optical wave as an inner optical path signal of base reference of the phase measurement system, the said second optical wave passing through the said first reflective surface serve as a first portion of signal of the said inner optical path, and the optical wave penetrating the second filter serve as a second portion of signal of the inner optical path;

Step 3: phase comparison is performed between the second portion of signal of the inner and outer optical path sequentially received by the second receiving device and the said first portion of signal of the said inner and outer optical path sequentially received by the said first receiving device; phase signal of the said inner and outer optical path with partially eliminated base reference is outputted, then phase comparison is performed between the said phase signal of the said inner and outer optical path with partially eliminated base reference, and phase signal with finally eliminated base reference is outputted.

According to another aspect of the present invention, the said first optical wave and the said second optical wave transmitted by the transmitting device are reflected by the said first reflective surface to produce the said first portion of optical wave signal of the said inner and outer optical path, and the said first receiving device receives in turn and uses the said first portion of optical wave signal of the inner and outer optical path as the said partially eliminated base reference.

According to a further aspect of the present invention, the said transmitting device at first transmits the said first optical wave and then transmits the said second optical wave, or transmits the said second optical wave at first and then transmits the said first optical wave.

Another object of embodiments of the present invention is to provide a distance-measuring device based on dual-transmitting and dual-receiving phase measurement, comprising:

a transmitting device comprising a laser diode (LD), light-emitting diode (LED) or other light-emitting devices that transmits light with one or more kinds of wavelengths, and used for transmitting dual-wavelength optical path signal which has a stable frequency, phase and amplitude;

a photoelectric conversion device comprising a first photoelectric conversion device and a second photoelectric conversion device, wherein the first photoelectric conversion device is used to receive the first portion of signal of the outer optical path and the first portion of signal of the inner optical path respectively, and the second photoelectric conversion device is used to receive the second portion of signal of the said outer optical path reflected by the detected object and the second portion of signal of the said inner optical path penetrating the second filter respectively;

a reflective surface comprising a first reflective surface and a second reflective surface, the said reflective surfaces are used to reflect the first optical wave and second optical wave which are received by the photoelectric conversion device; the said reflective surface being a reflective prism, a total reflective mirror or other parts having optical reflection function, and an optical fiber, light guide tube or other materials having an optical light-guiding function;

other reflective sheet comprising a reflective prism, a total reflective mirror or other parts having optical reflection function, and an optical fiber, light guide tube or other materials having an optical light-guiding function, and the said other reflective sheet is used to reflect the second optical wave filtered by the first filter, and reflect the said second optical wave which passes through the second filter and is received by the second receiving device;

a filter comprising a first filter and a second filter, the said filter being a coated optical glass, a coated optical plastic or other optical elements having the said above function, and used to turn on and turn off the optical path signal of the said outer optical path and the said inner optical path, and can reflect the optical wave of the outer optical path in the inner optical path;

a phase detector used to receive the signals outputted by the photoelectric conversion device respectively, and to perform phase comparison for signal at the two paths respectively and output a phase signal with eliminated base reference;

a frequency mixer used to mix the said first portion of signal of the said inner and outer optical path outputted by the said first photoelectric conversion device respectively with the same mixing signal, and amplify them and then output them to the phase detector; mix the said second portion of signal of the said inner and outer optical path outputted by the said second photoelectric conversion device respectively with the same mixing signal, and amplify them and then output them to the said phase detector.

the said photoelectric conversion device and the said frequency mixer are included in a receiving device, and the said receiving device comprises a photoelectric diode, photoelectric triode, avalanche photo diode or photoelectric multiplier tube.

an oscillator comprising a crystal oscillator, a phase locked loop, a frequency multiplier, a frequency divider or a direct digital synthesizer, which is used to generate and output the high-frequency oscillation signal and the mixing signal;

an amplifying device used to receive a signal outputted by the said photoelectric conversion device and then amplify and output the said signal.

Embodiments of the present invention provide a calibration method based on dual-transmitting and dual-receiving path phase measurement, using an optical wave transmitting device integrated from dual paths to generate inner and outer optical path signals via the reflective surfaces and different filters, using the signal receiving device to respectively receive the inner optical path signal and the outer optical path signal, then performing phase comparison for the signals at the two paths to obtain a phase difference to achieve phase compensation and calibration, avoid uncertain phase noise caused by environmental changes to the circuit, improve laser distance-measuring precision, increase distance-measuring stability of the system, reduce influence of environmental factors on distance-measuring errors, reduce the system's requirements for performance of the elements so as to cut the system cost and strengthen application of laser distance measurement in all industries.

Different from a conventional dual-transmitting single-receiving system, the dual-transmitting dual-receiving system uses one-path receiving system to sequentially receive two kinds of optical wave transmitted by the transmitting device and may eliminate a temperature drift caused by environmental temperature and self-generated heat through calibration; and meanwhile uses a different-wavelength optical path transmitting system and filter group to effectively separate inner and outer optical path, and improves compactness of the system and reduces radio frequency crosstalk and interference caused by scattered transmission as compared with the conventional dual-transmitting single-receiving solution which structurally uses the same-wavelength laser tube placed at different positions or angles respectively.

DESCRIPTION OF FIGURES

FIG. 2 is a flowchart for implementing a dual-transmitting and dual-receiving phase measurement calibration method according to the present invention;

DETAILED DESCRIPTION OF PREFERRED EMBODIMENTS

Figure 1:
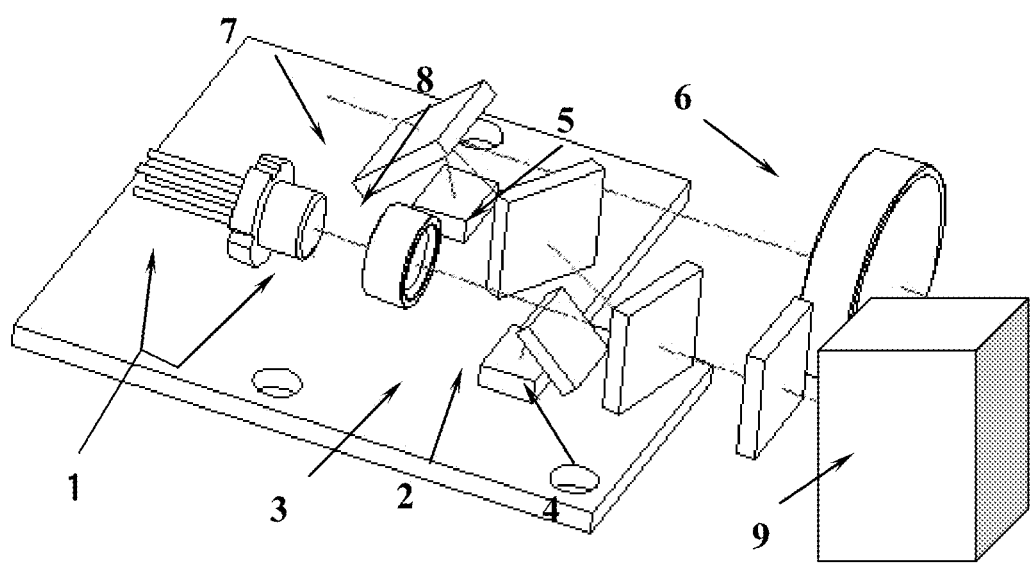
FIG. 1 is a structural schematic view of a distance-measuring system employing a dual-transmitting and dual-receiving phase measurement calibration method according to an embodiment of the present invention, wherein the reference number 1 denotes a transmitting device, 2 denotes a first reflective surface, 3 denotes a first receiving device, 4 denotes a first filter, 5 denotes a second filter, 6 denotes a receiving lens, 7 denotes a second reflective surface, 8 denotes a second receiving device, and 9 denotes a detected object.

The present invention will be further described in detail in combination with figures and embodiments to make objects, technical solutions and advantages of the present invention more apparent.

An embodiment of the present invention uses the calibration method based on the dual-transmitting and dual-receiving phase measurement system, a transmitting device 1 transmits a first optical wave and a second optical wave with different wavelengths sequentially, a first reflective surface 2 reflects the first optical wave and the second optical wave sequentially to a first receiving device 3 which receives the signals of the dual paths as a first portion of signals of inner and outer optical paths, and phase detection is performed for the signals of the dual paths; the optical wave not reflected by the first reflective surface 2 passes through a first filter 4 and a second filter 5 to respectively produce a second portion of signals of the inner and outer optical paths, then a second reflective surface 7 reflects the second portion of signals of the inner optical path and the second portion of signals of the outer optical path is bent back by a detected object 9 and goes through a receiving lens 6, which are received by a second receiving device 8 respectively, and phase comparison is performed for the second portion of signals of the inner and outer optical paths respectively with the first portion of signals of the inner and outer optical paths reflected by the first reflective surface 2, to obtain inner and outer optical path signals with partial reference base being eliminated, then phase comparison is performed for the obtained inner and outer optical path signals so as to eliminate additional phase shift, achieve phase error compensation and calibration while avoiding problems such as inconsistent temperature drift and electromagnetic interference crosstalk caused by the conventional method which uses a laser tube independent optical path with the same wavelength, optimize the structure of the distance-measuring device and improve stability and reliability of the product.

FIG. 2 is a flowchart to carry out the calibration method based on the dual-transmitting and dual-receiving phase measurement system according to the present invention, which will be described in detail as follows:

In step S201, the transmitting device 1 transmits first-wavelength optical wave, partial optical wave is reflected by the first reflective surface 2 and received by the first receiving device 3, the remaining portion of optical wave goes through the first filter 4 to reach the detected object 9, the said optical wave is bent back by the detected object 9 and then received by the second receiving device 8, wherein the first-wavelength optical wave is generated as outer optical path signal by modulating high-frequency oscillation signal, the optical wave received by the first receiving device 3 is the first portion of signals of the outer optical path, and the optical wave is bent back by the detected object 9 and then received by the second receiving device 8 is the second portion of signal of the outer optical path.

In step S202, the transmitting device 1 transmits the second-wavelength optical wave, partial optical wave is reflected by the first reflective surface 2 and received by the first receiving device 3, and the remaining portion of optical wave goes through the second filter 5 to reach the second receiving device 8, wherein the second-wavelength optical wave is generated as inner optical path signal of base reference by modulating high-frequency oscillation signal, the optical wave received by the first receiving device 3 is the first portion of signal of the inner optical path, and the optical wave passing through the second filter 5 to the second receiving device 8 is the second portion of signal of the inner optical path.

In step S203, the transmitting device 1 is switched sequentially to transmit the first optical wave and second optical wave when working in step 201 and step 202, phase comparison is performed between the second portion of signals of the inner and outer optical paths sequentially received by the second receiving device 8 and the first portion of optical wave of the inner and outer optical paths sequentially received by the first receiving device 3, phase signals of the inner and outer optical paths with partial base reference being eliminated are outputted, then phase comparison is performed for phase signals of the inner and outer optical paths with partial base reference being eliminated, and phase signals with the base reference being finally eliminated are outputted.

In an embodiment of the present invention, optical wave of the dual paths for phase comparison may be optical wave after going through frequency mixing with a mixing signal, wherein the mixing signal mixed with the optical wave at the dual paths may be the same high-frequency oscillation signal, or dual-path high-frequency oscillation signal with the same frequency, same phase or with a fixed phase difference.

In the embodiment of the present invention, the first optical wave and the second optical wave are both laser and are of different wavelengths.

In the embodiment of the present invention, the first receiving device 3 and the second receiving device 8 may first receive the first optical wave, and then receives the second optical wave; or may first receive the second optical wave and then receives the first optical wave. As an embodiment of the present invention, the receiving device may be a device with a photoelectric conversion function such as a photoelectric diode, a photoelectric triode, APD, or photoelectric multiplier tube.

Figure 3:
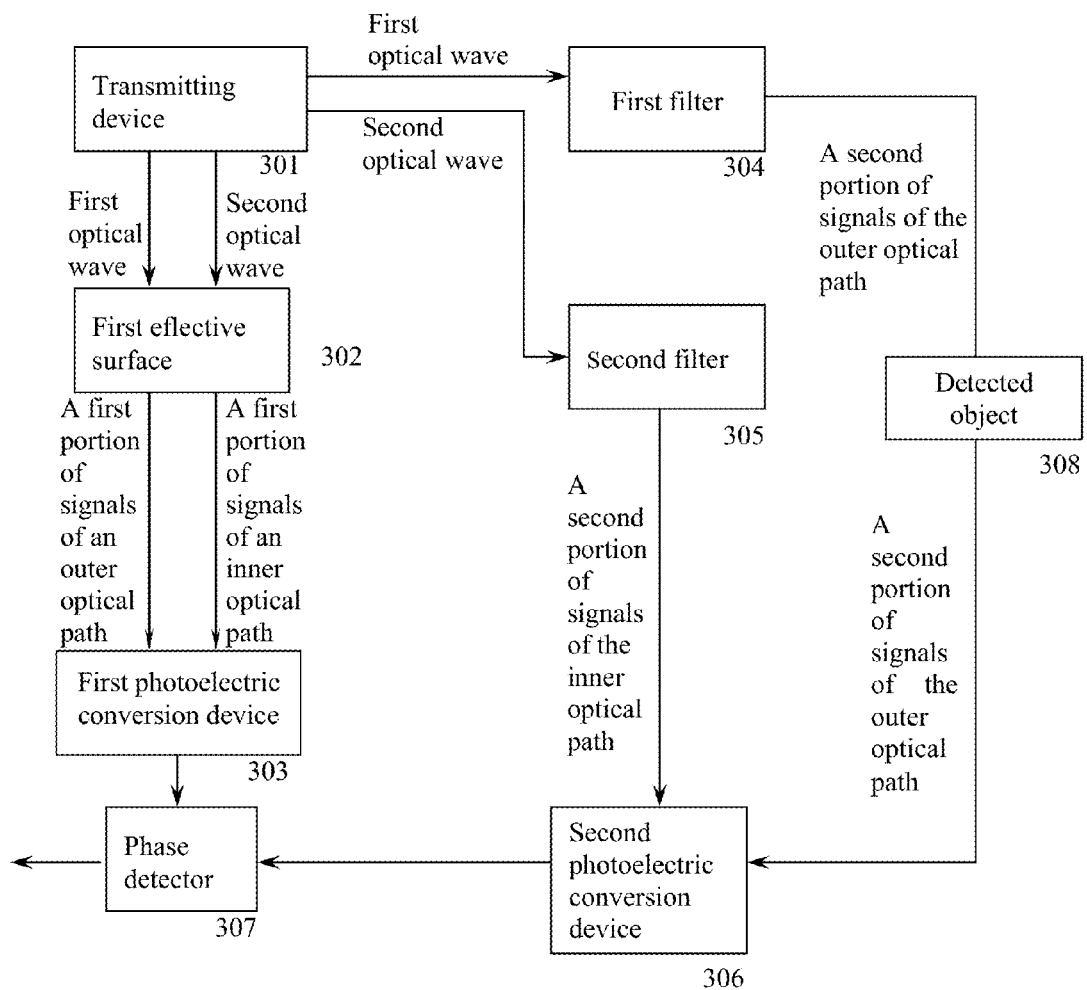
FIG. 3 is a systematic block diagram of a distance-measuring apparatus employing a dual-transmitting and dual-receiving phase measurement calibration method according to the present invention.

FIG. 3 is a systematic block diagram of a distance-measuring apparatus employing a dual-transmitting and dual-receiving phase measurement calibration method according to the present invention. For purpose of easy description, the figure only shows portions relevant to the embodiment of the present invention.

A transmitting device 301 modulates according to a first received high-frequency oscillation signal to generate first modulated optical wave, the optical wave pass through a first reflective surface 302 and be received by a first photoelectric conversion device 303, the signals received by the first photoelectric conversion device 303 are a first portion of signals of the outer optical path, the optical wave not reflected by the first reflective surface 302 pass through a first filter 304 and are transmitted to a detected object 308 as a second portion of signals of an outer optical path, the optical wave after being reflected back are received by a second photoelectric conversion device 306; meanwhile, the first optical wave are reflected by the first filter 304 and stopped by the second filter 305; then the transmitting device 301 transmits second-wavelength optical wave which pass through the first reflective surface 302 and are received by the first photoelectric conversion device 303, the signals received by the first photoelectric conversion device 303 are a first portion of signals of the inner optical path, the optical wave not reflected by the first reflective surface 302 pass through the second filter 305 to the second photoelectric conversion device 306 as a second portion of signals of the inner optical path, and meanwhile the second-wavelength optical wave are stopped by the first filter 304. The first photoelectric conversion device 303 and the second photoelectric conversion device 306 perform photoelectric conversion and output respectively for the inner optical path signal and outer optical path signals. At last, the phase detector 307 respectively performs phase detection between the signals outputted by the first photoelectric conversion device 303 and the second photoelectric conversion device 306, and performs phase comparison between the second partial signal of the inner and outer optical path respectively and the first partial signal of the inner and outer optical path to output the phase signals of the inner and outer optical paths with partial base reference being eliminated, then performs phase comparison between the outputted phase signals of the inner and outer optical path, and outputs phase signals with the base reference being finally eliminated.

In the embodiment of the present invention, the transmitting device 301 comprises a clock generator, a modulation drive circuit, a light emitting device, wherein the light emitting device, driven by the driver, emits optical wave, and the light emitting device may be a laser diode LD, light emitting diode LED or other light emitting devices. As an embodiment of the present invention, the transmitting device 301 may be a laser transmitting device such as a laser diode for emitting laser.

In the embodiment of the present invention, the first reflective surface 302, the first filter 304 and the second filter 305 all are optical devices and aim to reflect, distinguish, turn on or turn off the first-wavelength optical wave and second-wavelength optical wave to construct inner and outer devices of the distance-measuring device. The reflective surface and the filters may be a coated optical glass, coated optical plastic or other optical elements having the said above function.

In the embodiment of the present invention, the first reflective surface 302 aligns with the first photoelectric conversion device 303 so that the first optical wave and second optical wave are directly incident in the first photoelectric conversion device 303; the first filter 304 and second filter 305 align with the second photoelectric conversion device 306 so that the second optical wave are directly incident in the second photoelectric conversion device 306; a reflection mirror may be disposed between the second filter 305 and the second photoelectric conversion device 306 to change the optical path to facilitate reception by the second photoelectric conversion device 306; an optical signal transmission line may be connected between the second filter 305 and the second photoelectric conversion device 306, and the transmission line may be optical fiber or light guide tube.

In the embodiment of the present invention, the first photoelectric conversion device 303 and the second photoelectric conversion device 306 may be replaced by the first receiving device 3 and the second receiving device 8, and the receiving devices may be a photoelectrical conversion device such as an optoelectronic diode, optoelectronic triode, APD or multiplier-phototube.

In the embodiment of the present invention, the first photoelectric conversion device 303 and the second photoelectric conversion device 306 may first receive the outer optical path optical wave and then receive the inner optical path optical wave, or first receive the inner optical path optical wave and then receive the outer optical path optical wave.

Figure 4:
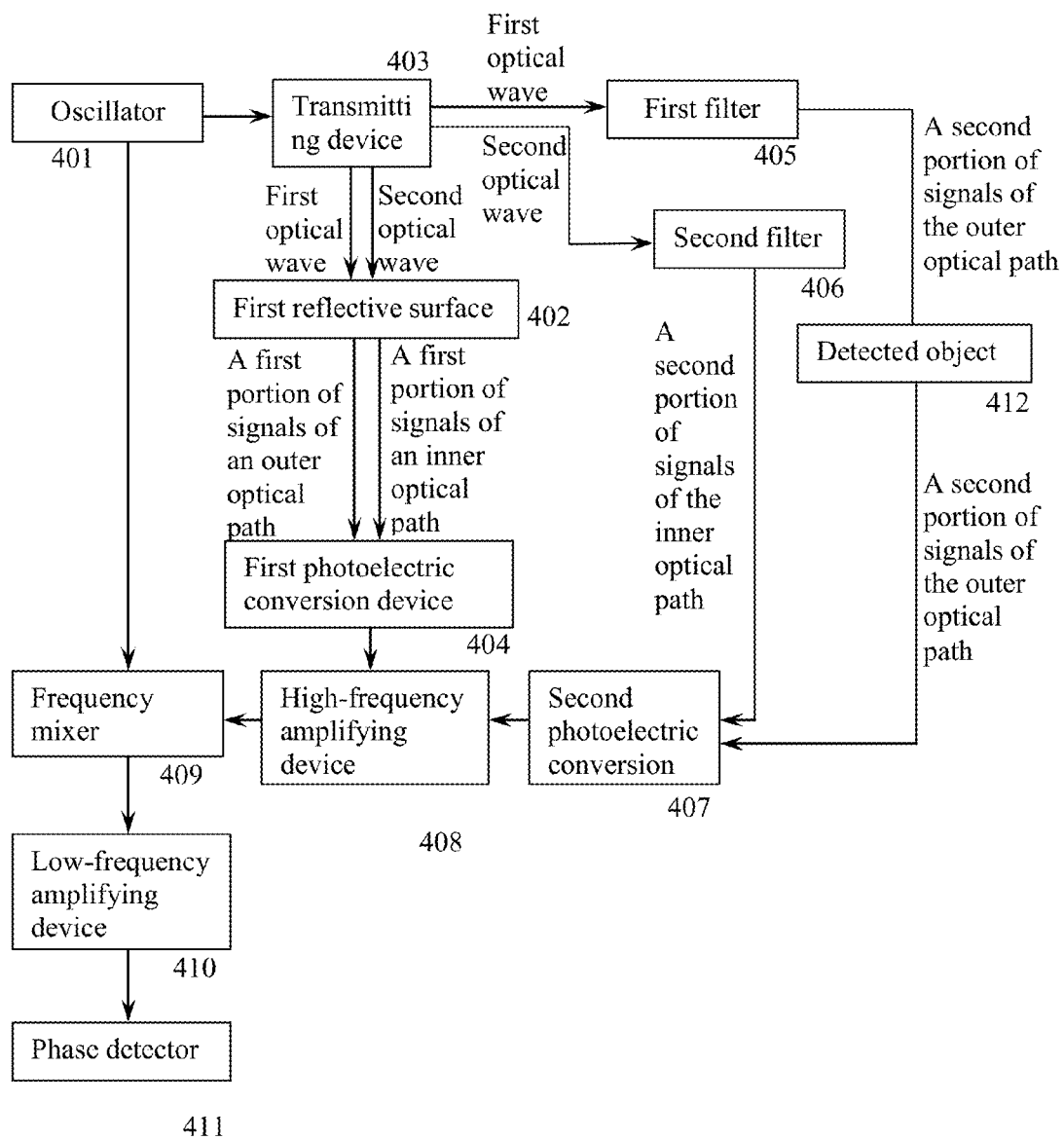
FIG. 4 is a systematic block diagram of a distance-measuring apparatus employing a dual-transmitting and dual-receiving phase measurement calibration method according to a first embodiment of the present invention.

FIG. 4 is a systematic block diagram of a distance-measuring apparatus employing a dual-transmitting and dual-receiving phase measurement calibration method according to a first embodiment of the present invention. For purpose of easy description, the figure only shows portions relevant to the embodiment of the present invention. As compared with FIG. 3, the calibration apparatus comprises an oscillator 401, a transmitting device 402, a first reflective surface 403, a photoelectric conversion device 404, a first filter 405, a second filter 406, a second photoelectric conversion device 407, and a high-frequency amplification device 408, a frequency mixer 409, a low-frequency amplification device 410 and a phase detector 411 for signal regulation and phase acquisition.

The oscillator 401 generates a first high-frequency oscillation signal and a second high-frequency oscillation signal having the same frequency and same phase, the transmitting device 402 receives the first high-frequency oscillation signal from the oscillator 401 and modulates first and second optical wave and transmits them as optical path signals; the first optical wave pass through the first reflective surface 403 and be received by the first receiving device 404 as a first portion of signals of the outer optical path, and electrical signals are outputted after performance of photoelectric conversion, the first optical wave not reflected by the first reflective surface 403 pass through the first filter 405 to the detected object 412 and are reflected back by the detected object 412 and received by the second photoelectric conversion device 407 as a second portion of signals of the outer optical path, and electrical signals are outputted after performance of photoelectric conversion, the electrical signals outputted by the photoelectric conversion devices 404, 407 are high-frequency electrical signals and then sequentially amplified by the high-frequency amplification device 408 and outputted, the frequency mixer 409 receives the signal from the amplification device 408 and mixes it with second high-frequency oscillation signal outputted by the oscillator 401 and outputs the mixed signal, the mixed signal is amplified by the low-frequency amplification device 410 and then enters the phase detector 411. Then, the second optical wave pass through the first reflective surface 403 and are received by the first receiving device 404 as the first portion of signals of the inner optical path, the optical wave not reflected by the first reflective surface 403 are reflected by the first filter 405 and pass through the second filter 406 as the second portion of signals of the inner optical path; according to the outer optical path signal procedure, finally the inner optical path and the outer optical path are detected by the phase detector respectively and a phase difference signal is outputted.

In the embodiment of the present invention, the oscillator 401 may be a crystal oscillator, a quartz oscillator, phase locked loop PLL, direct digital synthesizer DDS or other frequency generating devices and circuits.

In the embodiment of the present invention, the frequency mixer 409 may be an analog multiplier, down-conversion frequency mixer or other electronic frequency mixers and photoelectric frequency mixing devices having the frequency mixing function, such as a photoelectric diode, a photoelectric triode, APD, or photoelectric multiplier tube.

In the embodiment of the present invention, the photoelectric conversion devices 404, 407 and the frequency mixer 409 may be replaced by two receiving devices which may achieve the functions of the photoelectric conversion devices 404, 407 and the frequency mixer 409 simultaneously. As an embodiment of the present invention, the receiving devices may be one or more devices having the photoelectric conversion function, such as photoelectric diodes, photoelectric triodes, APDs, or photoelectric multiplier tubes PMTs.

In the embodiment of the present invention, the high-frequency amplification device 408 amplifies the received high-frequency electrical signals and is of a high cost, whereas the low-frequency amplification device 410 amplifies the mixed low-frequency electrical signals and is of a lower cost. If other devices of the circuit have excellent performance, both the high-frequency amplification device 408 and low-frequency amplification device 409 may be omitted, or one of them is omitted. If two receiving devices are used to replace the photoelectric conversion devices 404, 407 and the frequency mixer 409, the high-frequency amplification device 408 may be omitted, then the low-frequency amplification device 410 may be directly connected after the receiving devices 404, 407 and therefore the cost is lower.

Figure 5:
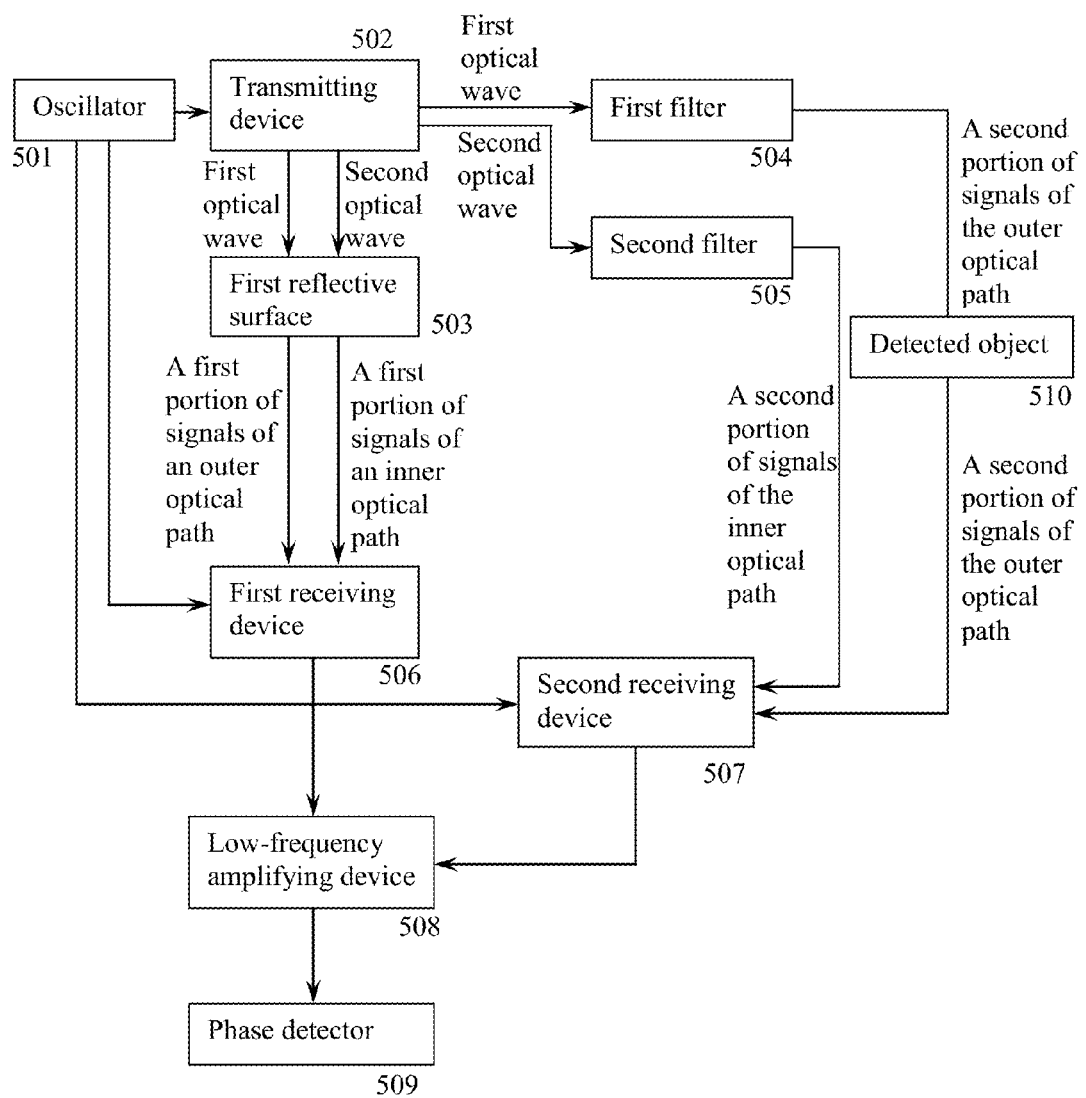
FIG. 5 is a systematic block diagram of a distance-measuring apparatus employing a dual-transmitting and dual-receiving phase measurement calibration method according to a second embodiment of the present invention.

FIG. 5 is a systematic block diagram of a distance-measuring apparatus employing a dual-transmitting and dual-receiving phase measurement calibration method according to a second embodiment of the present invention. For purpose of easy description, the figure only shows portions relevant to the embodiment of the present invention. As compared with FIG. 4, the calibration apparatus comprises an oscillator 501, a transmitting device 502, a first reflective surface 503, a first filter 504, a second filter 505, a low-frequency amplification device 508, a phase detector 509, and a first receiving device 506 configured to receive a first portion of signals of an inner optical path and a first portion of signals of an outer optical path reflected by the first reflective surface 503, mix them with a mixing signal respectively and output a mixed signal.

a second receiving device 507 configured to receive a second portion of signals of the inner optical path passing through the second filter 505 and a second portion of signals of the outer optical path reflected back by a detected object 510 for photoelectric conversion, mix them with a mixing signal respectively and output a mixed signal.

In the embodiment of the present invention, the first receiving device 506 replaces the first photoelectric conversion device 404 and the frequency mixer 409 in FIG. 4, and the second receiving device 507 replaces the second photoelectric conversion device 407 and frequency mixer 409 in FIG. 4.

Figure 6:
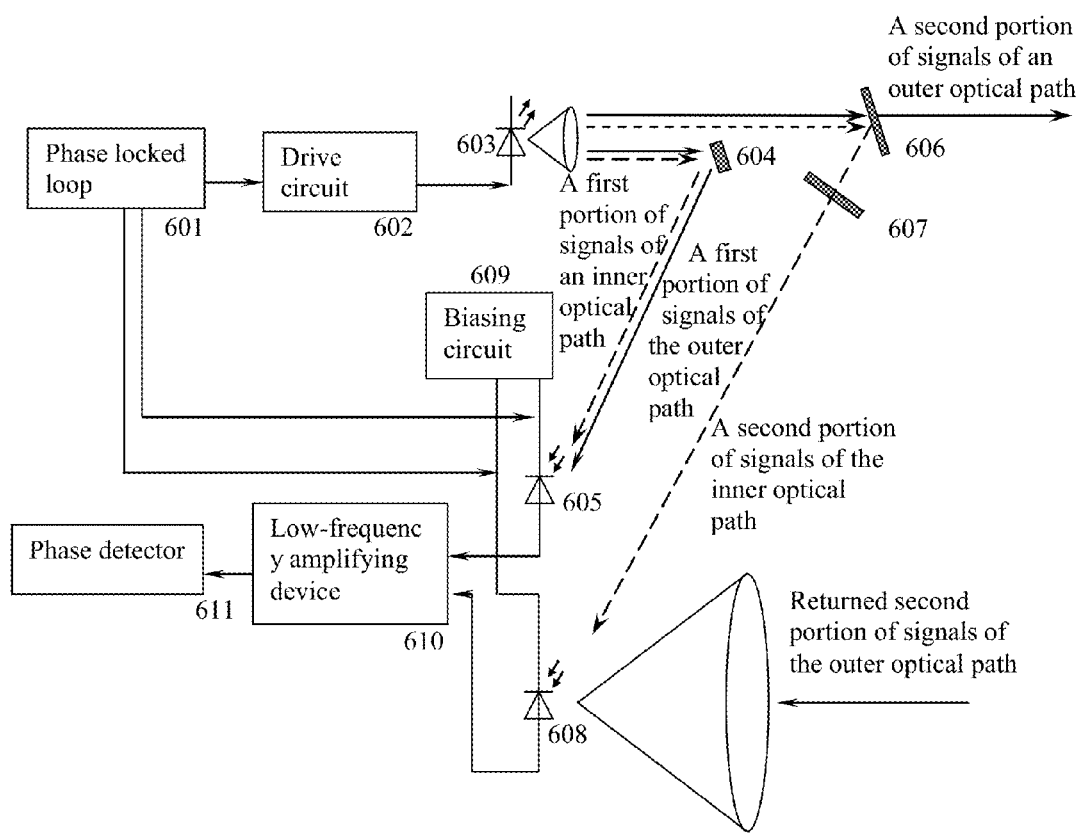
FIG. 6 is a structural diagram of a distance-measuring apparatus employing a dual-transmitting and dual-receiving phase measurement calibration method according to an embodiment of the present invention.

FIG. 6 is a structural diagram of a distance-measuring apparatus based on a dual-transmitting and dual-receiving phase measurement calibration method according to the first and second embodiments of the present invention. A phase locked loop 601 and a drive circuit 602, according to the high-frequency oscillation signal, drive a transmitting device 603 to transmit optical wave, the transmitted first optical wave pass through the first reflective surface 604 and are received by the first receiving device 605 as a first portion of signals of an outer optical path, the optical wave not reflected by the first reflective surface 604 transmit through a first filter 606 as a second portion of signals of an outer optical path, and are received by the second receiving device 608 after turning back; then the second optical wave transmitted by the transmitting device 603 pass through the first reflective surface 604 and are received by the first receiving device 605 as the first portion of signals of the inner optical path, the optical wave not reflected by the first reflective surface 604 are reflected by the first filter 606, pass through the second filter 607 and then are received by the second receiving device 608 as the second portion of signals of the inner optical path. The inner and outer optical path signals are respectively received by the receiving devices 605, 608 and subjected to photoelectric conversion and frequency mixture with the high-frequency mixing signal outputted by the phase-locked loop 601 via a biasing circuit 609, and is outputted to a phase detector 611 after being amplified by low-frequency amplifier 601. The phase detector 611 performs phase comparison of the second portion of signals of the inner and outer optical paths respectively with the first portion of signals of the inner and outer optical paths, outputs phase signals of the inner and outer optical paths with partial base reference being eliminated, then performs phase comparison for the phase signals of the inner and outer optical paths with partial base reference being eliminated, and finally outputs to obtain the phase with the base reference being eliminated.

In the embodiment of the present invention, the transmitting device 603 transmits optical wave which pass through the first reflective surface 604 to align with the first photoelectric conversion device 605 so that the optical wave are directly incident into the first photoelectric conversion device 605; the optical wave not reflected by the first reflective surface 604 pass through the first filter 606 and then align with the second receiving device 608 so that the optical wave are directly incident into the second receiving device 608; a reflection mirror or reflection mirror group 612 may be disposed between the second filter 607 and the second receiving device 608 to change the optical path to facilitate reception by the second receiving device 608; an optical signal transmission line may be mounted between the second filter 607 and the second receiving device 608 to complete transmission of the inner optical path optical signals, and the transmission line may be an optical fiber, light guide pipe or other optical light-permeable elements.

As an embodiment of the present invention, the first filter 606 may be disposed after the returned second portion of signals of the outer optical path, the dual-wavelength transmitting device 603 for switching inner and outer optical path signals transmits optical wave which pass through the first filter 606 and then align with the second receiving device 608 so that the optical wave are directly incident in the second receiving device 608; a reflection mirror or reflection mirror group 612 may be disposed between the second filter 607 and the second receiving device 608 to change the optical path to facilitate reception by the second receiving device 608; an optical signal transmission line may be mounted between the second filter 607 and the second receiving device 608 to complete transmission of the inner optical path optical signals, and the transmission line may be an optical fiber, light guide pipe or other optical light-permeable elements.

For the above embodiments, a specific example is presented as follows:

As shown in FIG. 6, the transmitting device 603 transmits a 650 nm-wavelentth first optical wave and a 780 nm-wavelength second optical wave, which pass through the first reflective surface 604 to form the first portion of signals of the outer optical path and the first portion of signals of the inner optical path, which are mixed, amplified and phase detected to obtain a phase $\Psi_{out1}$ of the first portion of signals of the outer optical path and a phase $\Psi i_{n1}$ of the first portion of signals of the inner optical path, the second portion of signals of the outer optical path passing through the first filter 606 are subjected to mixing, amplification and phase detection to obtain a phase $\Psi_{out2}$ of the second portion of signals of the outer optical path, the second portion of signals of the inner optical path passing through the second filter 607 are subjected to mixing, amplification and phase detection to obtain a phase $\Psi_{in2}$ of the second portion of signals of the outer optical path, an additional phase shift generated by an electronic signal generated by a signal generating device in the instrument in the first portion of signals during circuit transfer and photoelectric conversion is $\Delta\Psi_1$, and an additional phase shift generated by an electronic signal generated by a signal generating device in the instrument in the second portion of signals during circuit transfer and photoelectric conversion is $\Delta\Psi_2$, and a signal phase generated by the transmitting device is $\Psi_{transmit}$, and the phase differences of the distance-measuring signal sequentially passing through the inner optical path and outer optical path are $\Psi_{in}$ and $\Psi_{out}$ respectively, then:

$$\Psi_{in2}=\Delta\Psi_2+\Psi_{in}+\Psi_{transmit}$$

$$\Psi_{out2}=\Delta\Psi_2+\Psi_{out}+\Psi_{transmit}$$

$$\Psi_{in1}=\Delta\Psi_1+\Psi_{transmit}$$

$$\Psi_{out1}=\Delta\Psi_1+\Psi_{transmit}$$

After phase comparison is performed for the second portion of signals of the inner and outer optical paths and the first portion of signals of the inner and outer optical paths, a phase drift caused by mismatch of the laser tube and temperature and a portion of additional phase shift generated by the signal in the instrument during circuit transfer and photoelectric conversion are eliminated, then, $$\Phi_{in}=\bigcirc_{in2}-\Psi_{in1}=\Delta\Psi_2-\Delta\Psi_1+\Psi_{in}$$

$$\Phi_{out}=\Psi_{out2}-\bigcirc_{out1}=\Delta\bigcirc_2-\Delta\Phi_1+\bigcirc_{out}$$

A phase comparison is performed for the inner and outer optical path signals outputted after the phase comparison performed for the second portion of signals of the inner and outer optical paths and the first portion of signals of the inner and outer optical paths, to obtain a signal phase of the additional phase shift generated by an electronic signal generated by a signal generating device in the instrument during circuit transfer and photoelectric conversion, namely, the measured phase result as follows:

$$\Phi = \Phi_{out} - \Phi_{in} = (\Delta\Psi_2 - \Delta\Psi_1 + \Psi_{out}) - (\Delta\Psi_2 - \Delta\Psi_1 + \Psi_{in}) = \Psi_{out} - \Psi_{in}$$

A group of data is listed as follows:
$\Psi_{in1}=30895$ $\Psi_{in2}=41411$
$\Psi_{out1}=14786$ $\Psi_{out2}=49446$
Then, $\Phi in=10516$
$\Phi out=34660$ It is obtained that $\Phi=24144$.

The above data are only one of groups of data. Multiple groups of phase data are averaged to obtain a final measured phase, then calculation is performed by an algorithm to obtain a measured distance is 1.672 m.

The prior art uses an optical wave transmitting device to generate optical wave at one path, a light beam conversion device needs to be used to change the optical path to obtain the inner and outer optical paths, multiple times of conversion by the light beam conversion device will generate a mechanical load, mechanical wear is inevitable, a response time of the circuit is long, additionally presence of the light beam conversion device necessarily causes a complicated circuit, large size and high cost; as compared with the prior art, embodiments of the present invention may use a control circuit to control on and off and switching of the inner and outer optical paths, avoid using a mechanical switch for control, achieve a quick response time due to control by the control circuit, a time interval for receiving the inner and outer optical signals is short, the switching time interval is in the magnitude of millisecond, and it can be believed that ambient environment during circuit switching does not change, the circuit is not affected and measurement precision is not affected.

Besides, there is a solution using a conventional dual transmitting and single-receiving manner, i.e., two independent laser diodes LD generates optical wave signals at two paths to form inner and outer optical paths, and said signals are received respectively by an avalanche photo diode APD to achieve a phase with the base signal being eliminated. During implementation of this solution, operation time and operation environment of the dual independent LDs during operation are different, the operation states of the two LDs are different and the base signal cannot be completely eliminated; additionally the LD devices have large discreteness, and difference between different diodes also directly causes large errors. As compared with the above dual-LD and single-APD solution, embodiments of the present invention use dual APDs, the first portion of signals of the inner and outer optical paths are received via one APD, then subjected to phase detection and then subjected to phase comparison with the second portion of signals of the inner and outer optical paths received by the other APD, whereby to eliminate phase drift caused by difference between different LDs and temperature and achieve a higher precision than said dual-LD single-APD solution.

To conclude, embodiments of the present invention provide a calibration method based on dual transmission and dual optical path reception, use two different wavelengths, reflective surfaces and two corresponding filters to respectively switch the inner and outer optical path signals, then the first portion of signals of the inner and outer optical paths and the second portion of signals of the inner and outer optical paths are received by two signal receiving devices respectively, the inner optical path and outer optical path signals are subjected to photoelectric conversion, frequency mixing, amplification and phase detection, the signals with the base being eliminated are outputted so as to avoid the uncertain phase noise caused by environmental changes to the circuit, the control circuit is used to control the switching of the inner and outer optical paths so as to stably and fast achieve phase error compensation and calibration, reduce influence of environmental factors on distance-measuring errors, improve laser distance-measuring precision, increase distance-measuring stability of the system, reduce the system's requirements for performance of the elements so as to cut the system cost and strengthen application of laser distance measurement in all industries. What are descried above is only preferred embodiments of the present invention and is not intended to limit the present invention. Any modifications, equivalent substitutions and improvements within the scope of spirit and principle of the present invention shall all be included in the protection scope of the present invention.

We claim:

1. A calibration method based on dual-transmitting and dual-receiving phase measurement system, wherein the said method comprises the following steps:
    step 1 for forming an outer optical path, in which:
        a transmitting device transmits a first optical wave, the partial wave of the first optical wave is received by a first receiving device via a first reflective surface, and the remaining optical wave passes through a first filter to a detected object, and is bent back and then passes through a receiving lens and is focused by a second reflective surface, and then is received by a second receiving device;
        wherein the said first optical wave passes through the said first reflective surface and the said first filter to make two paths of optical wave as outer optical path signal of the phase measurement system, the said first optical wave passing through the said first reflective surface serves as a first portion of signal of the outer optical path, and the optical wave penetrating the first filter serves as a second portion of signal of the outer optical path; and
        when the said optical wave passes through the said first filter, a partial optical wave is reflected by the first filter or by other reflective sheets towards a second receiving device and is filtered by a second filter simultaneously;
    step 2 for forming an inner optical path, in which:
        the said transmitting device transmits a second optical wave, the partial wave of the second optical wave is received by a first receiving device via a first reflective surface, and the remaining optical wave is filtered by the first filter and reflected by the said first filter or other reflective sheets, and then passes through the second filter to reach the second reflective surface, and then is received directly by the second receiving device; and
        wherein the said second optical wave passes through the said first reflective surface and the said second filter to make two paths of optical wave as an inner optical path signal of base reference of the phase measurement system, the said second optical wave passing through the said first reflective surface serve as a first portion of signal of the said inner optical path, and the optical wave penetrating the second filter serves as a second portion of signal of the inner optical path; and
    step 3, in which:
        phase comparison is performed between the second portion of signal of the inner and outer optical path sequentially received by the second receiving device and the said first portion of signal of the said inner and outer optical path sequentially received by the said first receiving device; and phase signal of the said inner and outer optical path with partially eliminated base reference is outputted, then phase comparison is performed between the said phase signal of the said inner and outer optical path with partially eliminated base reference, and phase signal with finally eliminated base reference is outputted.

2. The method according to claim 1, wherein the said first optical wave and the said second optical wave transmitted by the transmitting device are reflected by the said first reflective surface to produce the said first portion of optical wave signal of the said inner and outer optical path, and the said first receiving device receives in turn and uses the said first portion of optical wave signal of the inner and outer optical path as the said partially eliminated base reference.

3. The method according to claim 1, wherein the said transmitting device at first transmits the said first optical wave and then transmits the said second optical wave, or transmits the said second optical wave at first and then transmits the said first optical wave.

4. The method according to claim 1, wherein the said first optical wave and the said second optical wave are both optical waves emitted by a laser diode, a light-emitting diode or other light-emitting devices.

5. A distance-measuring device based on dual-transmitting and dual-receiving phase measurement system, comprising:
a transmitting device including a laser diode, light-emitting diode or other light-emitting devices that transmits light with one or more kinds of wavelengths, and is used for transmitting dual-wavelength optical path signal which has a stable frequency, phase and amplitude;
a photoelectric conversion device including a first photoelectric conversion device and a second photoelectric conversion device, wherein the first photoelectric conversion device is used to receive the first portion of signal of the outer optical path and the first portion of signal of the inner optical path respectively, and the second photoelectric conversion device is used to receive the second portion of signal of the said outer optical path reflected by the detected object and the second portion of signal of the said inner optical path penetrating the second filter respectively;
a reflective surface including a first reflective surface and a second reflective surface, the said reflective surfaces are used to reflect the first optical wave and second optical wave which are received by the photoelectric conversion device; the said reflective surface being a reflective prism, a total reflective mirror or other parts having optical reflection function, and an optical fiber, light guide tube or other materials having an optical light-guiding function;
other reflective sheet including a reflective prism, a total reflective mirror or other parts having optical reflection function, and an optical fiber, light guide tube or other materials having an optical light-guiding function, and the said other reflective sheet is used to reflect the second optical wave filtered by the first filter, and reflect the said second optical wave which passes through the second filter and is received by the second receiving device;
a filter including a first filter and a second filter, the said filter being a coated optical glass, a coated optical plastic or other optical elements having the said above function, and used to turn on and turn off the optical path signal of the said outer optical path and the said inner optical path, and reflects the optical wave of the outer optical path in the inner optical path; and
a phase detector used to receive the signals outputted by the photoelectric conversion device respectively, and to perform phase comparison for signal at the two paths respectively and output a phase signal with eliminated base reference.

6. A distance-measuring device according to claim 5, further comprising a frequency mixer adapted to:
mix the said first portion of signal of the said inner and outer optical path outputted by the said first photoelectric conversion device respectively with the same mixing signal, and amplify them and then output them to the phase detector; and
mix the said second portion of signal of the said inner and outer optical path outputted by the said second photoelectric conversion device respectively with the same mixing signal, and amplify them and then output them to the said phase detector.

7. A distance-measuring device according to claim 6, wherein the said photoelectric conversion device and the said frequency mixer are included in a receiving device and the said receiving device comprises a photoelectric diode, photoelectric triode, avalanche photo diode or photoelectric multiplier tube.

8. A distance-measuring device according to claim 7, further comprising:
an oscillator including a crystal oscillator, a phase locked loop, a frequency multiplier, a frequency divider or a direct digital synthesizer, which is used to generate and output the high-frequency oscillation signal and the mixing signal; and
an amplifying device used to receive a signal outputted by the said photoelectric conversion device and then amplify and output the said signal.

9. The method according to claim 3, wherein the said first optical wave and the said second optical wave are both optical waves emitted by a laser diode, a light-emitting diode or other light-emitting devices.

10. The method according to claim 3, wherein the said first optical wave and the said second optical wave are both optical waves emitted by a laser diode, a light-emitting diode or other light-emitting devices.

* * * * *